United States Patent
Won

(10) Patent No.: US 6,510,163 B1
(45) Date of Patent: Jan. 21, 2003

(54) NETWORK INTERFACE FOR INTERFACING PDH NETWORK AND ATM NETWORK

(75) Inventor: Chan-Yeon Won, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/121,903

(22) Filed: Jul. 24, 1998

(30) Foreign Application Priority Data

Jul. 25, 1997 (KR) ............................................ 97-35056

(51) Int. Cl.⁷ ................................................. H04J 3/16
(52) U.S. Cl. ........................ 370/466; 370/467; 370/469; 370/470
(58) Field of Search ................................. 370/466, 468, 370/467, 469, 470, 471, 465, 395.1, 395.5

(56) References Cited

U.S. PATENT DOCUMENTS

| | | | |
|---|---|---|---|
| 5,274,768 A | 12/1993 | Traw et al. | |
| 5,446,734 A | 8/1995 | Goldstein | |
| 5,450,411 A | 9/1995 | Heil | |
| 5,483,527 A | 1/1996 | Doshi et al. | |
| 5,524,113 A | 6/1996 | Gaddis | |
| 5,577,039 A | * 11/1996 | Won et al. ................... | 370/466 |
| 5,606,559 A | 2/1997 | Badger et al. | |
| 5,619,500 A | 4/1997 | Hiekali | |
| 5,689,512 A | 11/1997 | Bitz et al. | |
| 5,706,285 A | 1/1998 | Saijonmaa et al. | |
| 5,771,350 A | 6/1998 | Kim | |
| 5,892,770 A | * 4/1999 | Wolf et al. .................. | 370/468 |
| 6,034,954 A | * 3/2000 | Takase et al. ................ | 370/362 |
| 6,115,381 A | * 9/2000 | Benenti et al. .............. | 370/395 |

* cited by examiner

Primary Examiner—Huy D. Vu
Assistant Examiner—Thien Tran
(74) Attorney, Agent, or Firm—Robert E. Bushnell, Esq.

(57) ABSTRACT

An interface apparatus of PDH network and ATM network, which includes a line interface unit for interfacing between the PDH network and the ATM network to receive bipolar analog data of T1 or E1 and provide PDH digital data when the ATM network receives data from the PDH network, and to receive PDH digital data and provide primary bipolar analog data of T1 or E1 when the PDH network receives data from the ATM network; a framer for framing received multiple T1/E1 channelized data of the PDH network to generate frames and provide T1/E1 PDH data in one of a T1 and a E1 unchannelized mode, and to provide synchronization information and signaling information in one of a T1 and a E1 channelized mode; an interface controller which, in one of the T1 and E1 channelized mode, receives the synchronization information and signaling information to distinguish time slot from said framer, and provides an interface signal containing information of frame overhead; an ATM Adaption Layer type 1—Segmentation and Reassembly (AAL1-SAR) device which divides ATM cells into a PDH data stream or reassembles PDH data stream into ATM cells, and services PCM transfer data which contains characteristics of PDH network in the ATM network.

18 Claims, 3 Drawing Sheets

NETWORK INTERFACE FOR INTERFACING PDH NETWORK AND ATM NETWORK

CLAIM FOR PRIORITY

This application makes reference to, incorporates the same herein, and claims all benefits accruing under 35 U.S.C. §119 from an application for AN APPARATUS FOR INTERFACING PDH NETWORK AND ATM NETWORK earlier filed in the Korean Industrial Property Office on the Jul. 25, 1997, and there duly assigned Ser. No. 35056/1997, a copy of which application is annexed hereto.

BACKGROUND OF THE INVENTION

1. Technical Field

The present invention relates to a network interface for transferring constant bit rate (CBR) data, e.g. voice and real-time data between an Asynchronous Transfer Mode (ATM) network and a Plesiochronous Digital Hierarchy (PDH) network, and more specifically, relates to a network interface between an ATM network and a PDH network for handling four different types of services such as connecting the ATM network by the PDH primary rate (T1/E1) of 1.544 Mbps (T1) rate, 2.048 Mbps (E1) rate, T1 channelized (64 kbps×24 time slots) data and E1 channelized (64 kbps×30 time slots or 64 kbps×31 time slots) data.

2. Related Art

Generally, ATM is a specific packet-oriented transfer mode using an asynchronous time division multiplexing technique where both line switching and packet switching are unified and many pieces of data information such as voice, video, and data are organized in fixed-sized packets, called cells each comprised of a data portion and a header portion for storing destination information needed to route the cell through the network at a constant bit rate (CBR). The operation of ATM networks is well known and therefore, need not be described herein. A network interface is required to permit the ATM network to interface with another ATM network or different types of existing signaling networks such as disclosed in U.S. Pat. No. 5,274,768 for High-Performance Host Interface For ATM Networks issued to Traw et al., U.S. Pat. No. 5,450,411 for Network Interface For Multiplexing And Demultiplexing Isochronous And Bursty Data Streams In ATM Networks issued to Heil, U.S. Pat. No. 5,483,527 for Terminal Adapter For Interfacing An ATM Network With A STM Network issued to Doshi et al., U.S. Pat. No. 5,524,113 for ATM Switch Interface issued to Gaddis, U.S. Pat. No. 5,606,559 for System And Method For An Efficient ATM Adapter/Device Driver Interface issued to Badgeret al., U.S. Pat. No. 5,619,500 for ATM Network Interface issued to Hiekali, U.S. Pat. No. 5,689,512 for ATM Cell Interface And Method For Dispatching An ATM Cell issued to Bitz et al., and U.S. Pat. No. 5,706,285 for Network Interfacing Method And A Network Interface For A Digital Transmission Network issued to Saijonmaa et al., and U.S. Pat. No. 5,771,350 for Asynchronous Transfer Mode (ATM) Network Adaptor For The Simultaneous Processing Of The Multi-Channel Traffic issued to Won.

ATM network may also be crossed connected with a plesiochronous digital hierarchy (PDH) a network in the manner disclosed, for example, in U.S. Pat. No. 5,577,039 for System And Method Of Signal Transmission Within A Plesiochronous Digital Hierarchy unit Using ATM Adaptation Layers issued to Won et al., and assigned to the assignee of the instant application. Generally, PDH network users who receive T1 or E1 transfer service through a private automatic branch exchange (PABX) are supported by ATM network. However, an interface of PDH network is different from that of ATM network. Accordingly, a matching interface module is needed. A printed circuit board (PCB) is typically used to perform a single interface function between an ATM network and a PDH network. Since the ATM network and the PDH network support four different services such as connecting the ATM network by the PDH primary rate (T1/E1) of 1.544 Mbps data rate for T1 lines, and 2.048 Mbps data rate for E1 lines, T1 channelized (64 kbps×24 time slots) data and E1 channelized (64 kbps×30 time slots or 64 kbps×31 time slots) data, four different types of printed circuit boards (PCB) are needed for interfacing the ATM network and the PDH network. The users must purchase no other printed circuit board (PCB) but the one intended to support the service, and the printed circuit board (PCB) is not useful when the service type is changed. The users must then purchase another printed circuit board (PCB) according to the channel characteristics of 1.544 Mbps (T1) rate, 2.048 Mbps (E1) rate, 64 kbps time slotized channel, and 64 kbps time slotized E1.

SUMMARY OF THE INVENTION

Accordingly, it is therefore an object of the present invention to provide a network interface for interfacing an asynchronous transfer mode (ATM) network and a plesiochronous digital hierarchy (PDH) network.

It is also an object to provide a single interface module for supporting four different types of services for PDH network subscribers using an ATM network.

It is an another object to provide a network interface of an ATM network and a PDH network for supporting four different types of primary rates such as T1 (1.544 Mbps), E1 (2.048 Mbps), T1 channelized (64 kbps×24 time slots) data, E1 channelized (64 kbps×30 time slots, or 64 kbps×31 time slots) data, and enabling the ATM network and the PDH network to work together using an interface control signal generated according to the characteristics of the PDH network.

These and other objects of the present invention can be achieved by a network interface for providing an interface between an ATM network and a PDH network which comprises a line interface unit (LIU) for interfacing between the ATM network and the PDH network such that when ATM network receives data from PDH network, the line interface unit receives bipolar analog data of T1 or E1 and provides a receiving clock of T1 or E1, and PDH digital data, and when PDH network receives data from ATM network, the line interface unit receives the PDH digital data and provides primary bipolar analog data of T1 or E1. A framer is connected to the line interface unit for framing the received multiple T1/E1 channelized data of PDH network to generate frames and provide T1/E1 PDH data in a T1 or E1 unchannelized mode, and provide synchronization information and signaling information of 64 kbps×n (n=30 or 31) service. An interface controller which, in the T1 channelized and E1 channelized mode, receives and revises the synchronization information and signaling information to distinguish time slot from the framer, and provides an interface signal which is the information of frame overhead. An AAL1-SAR device which divides ATM cell into PDH data stream or reassembles PDH data stream into ATM cell, and services PCM transfer data which have the characteristics of CBR (Constant Bit Rate) of PDH network in the ATM network. A cell multiplexer which functions as cell buffer, and also serves as multiplexer and demultiplexer. A router which controls VPI/VCI (Virtual Path Identifier/Virtual Channel Identifier) of ATM cell at the routing table according to path, and sends the VPI/VCI value which is the result path of the link, to the header of ATM cell. A buffer which receives ATM cell stream from the router for storage, and at the request of SSU (STARacer Switching Unit) which performs cell-switching at the ATM network system, provides the stored ATM cell stream. A central processing unit (CPU) module which works with SPU (STARacer Processing Unit) connected to ATM network and NMS (Network Management System). An address/data decoder which interfaces with the CPU module according to the address region and data region depending on each input/output devices. An interrupt controller which assigns interrupt priority to the input/output devices of prepared cycle, and controls the interrupt which is sent to the CPU module. A bus controller which interfaces with each input/output devices according to 8, 16, and 32 bit data bus types. A bus arbitrator which controls the right to use buses between the CPU module and an Ethernet controller. An Ethernet controller which supports IPC (Inter-Process Communication) in the ATM network. A clock controller which extracts and processes clock synchronization information of PDH data stream contained in the cell stream of the ATM network; and a system clock distributor which receives a system clock of 50 MHz and 8 KHz, and divides the system clock to the input/output devices.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
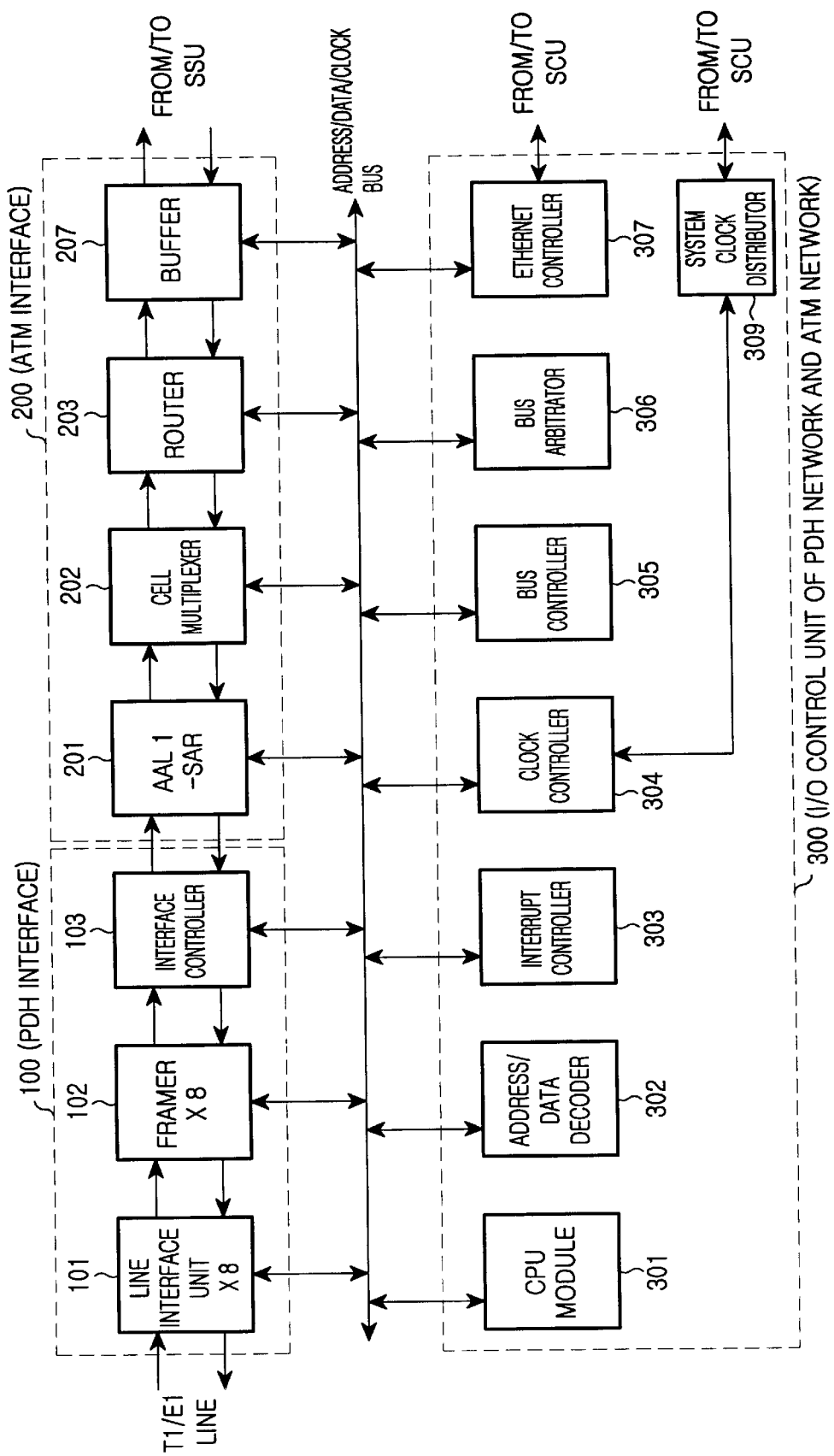
FIG. 1 illustrates a block diagram of a network interface for interfacing an ATM network and a PDH network according to a preferred embodiment of the present invention.

Referring now to the drawings and particularly to FIG. 1, which illustrates a network interface for interfacing an ATM network and a PDH network according to a preferred embodiment of the present invention. A single interface module is used for PDH network subscribers to receive T1/E1 transfer services by using an ATM network. T1 service is provided by North American Standard dedicated lines for carrying 24 simultaneous voice/data channels with a data rate of 1.544 megabits/second (Mbps), while E1 service is provided other dedicated lines outside of North American for carrying 32 simultaneous voice/data channels with a data rate of 2.048 megabits/second (Mbps). As shown in FIG. 1, the network interface comprises a PDH interface 100, an ATM interface 200, and an input/output control unit 300 for controlling the interface between the ATM network and the PDH network according to the characteristics of the PDH network.

The PDH interface 100 includes a line interface unit (LIU) 101, a framer 102, and an interface controller 103 connected to the ATM interface 200 and the input/output control unit 300 via an address/data/clock bus. The line interface unit 101 is interfaced between PDH network and ATM network for receiving bipolar analog data of T1 or E1 from PDH network to provide a receiving clock of T1 or E1 and PDH digital data, when ATM network receives data from PDH network, and for receiving PDH digital data from ATM network to provide primary bipolar analog data of T1 or E1, when PDH network receives data from ATM network. The framer 102 is connected to the line interface unit 101 and the address/data/clock bus for framing received multiple T1/E1 channelized data of PDH network to generate T1/E1 PDH data to the AAL1-SAR 201 of ATM interface 200 in a T1 or E1 unchannelized mode, and provide synchronization information and signaling information of 64 kbps×n (n=30 or 31) service in a T1 or E1 channelized mode. The interface controller 103 which, in the T1 channelized and E1 channelized mode, receives and revises the synchronization information and signaling information to distinguish time slot from the framer 102, and provides an interface signal which is information of frame overhead to the AAL1-SAR 201 of ATM interface 200.

The ATM interface 200 includes an ATM adaptation layer 1—Segmentation and Reassembly (AAL1-SAR) 201, a cell multiplexer 202, a router 203, and a buffer 207. The AAL1-SAR 201 which divides ATM cell into PDH data stream or reassembles PDH data stream into ATM cell, and services PCM transfer data which have the characteristics of CBR (Constant Bit Rate) of PDH network in the ATM network. The cell multiplexer 202 which functions as cell buffer, and also serves as a multiplexer and a demultiplexer. The router 203 which controls the routing of ATM cells based on virtual path identifier/virtue channel identifier (VPI/VCI) at the routing table according to path, and sends the VPI/VCI value which is the result path of the link, to the header of ATM cell. The buffer 207 which receives ATM cell stream from the router 203 for storage, and at the request of a STARacer Switching Unit (SSU) which performs cell-switching at the ATM network, provides the stored ATM cell stream.

The input/output (I/O) control unit 300 includes a central processing unit (CPU) module 301, an address/data decoder 320, an interrupt controller 303, a clock controller 304, a bus controller 305, a bus arbitrator 306, an Ethernet controller 307, and a system clock distributor 309. The CPU module 301 works with a STARacer Processing unit (SPU) connected to the ATM network and network management system (NMS). The address/data decoder 302 interfaces with the CPU module 301 according to the address region and data region depending on each input/output devices. The interrupt controller 303 assigns interrupt priority to the input/output devices of prepared cycle, and controls the interrupt which is send to the CPU module 301. The bus controller 305 interfaces with each input/output devices according to 8, 16, and 32 bit data bus types. The bus arbitrator 306 controls the right to use buses between the CPU module 301 and the Ethernet controller 307. The Ethernet controller 307 supports IPC (Inter-Process Communication) in the ATM network. The clock controller 304 extracts and processes clock synchronization information of PDH data stream contained in the cell stream of the ATM network; and the system clock distributor 309 receives system clock of 50 MHz and 8 KHz, and processes and divides clock to the input/output devices.

Figure 2A:
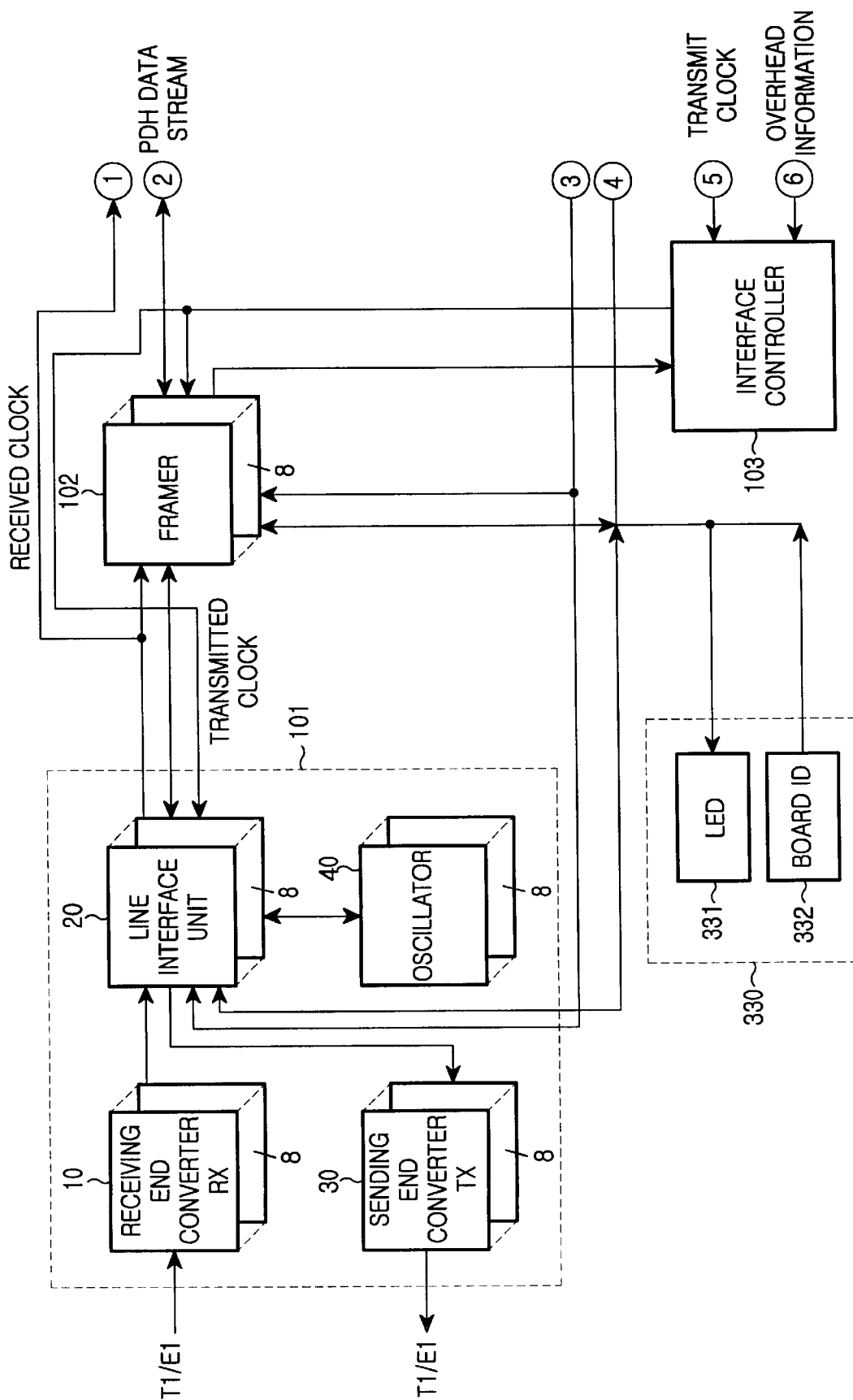
FIGS. 2A and 2B illustrate a detailed circuit diagram of a network interface for interfacing an ATM network and a PDH network according to the preferred embodiment of the present invention.
Figure 2B:
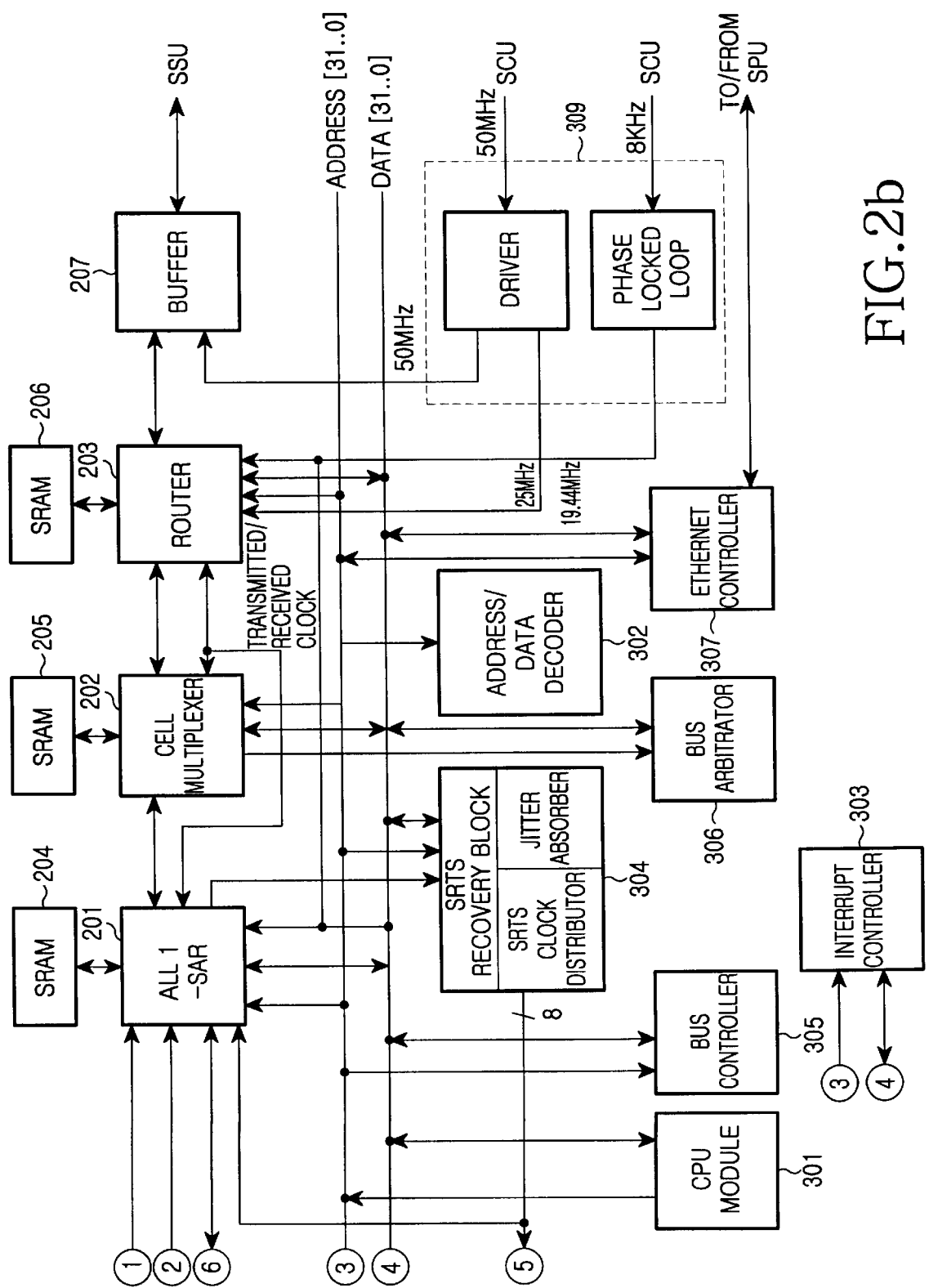

Turning now to FIGS. 2A and 2B which provide a detailed circuit diagram of a network interface for interfacing an ATM network and a PDH network according to the preferred embodiment of the present invention. FIG. 2A illustrates a detailed circuit diagram of a line interface unit 101 of PDH interface 100 in combination with a framer 102, an interface controller 103 and a board identification unit 330. FIG. 2B illustrates a detailed circuit diagram of a clock controller 304 and a system clock distributor 309 of ATM interface 200 in combination with an input/output (I/O) control unit 300.

As shown in FIG. 2A, the line interface unit 101 includes an receiving end converter RX 10 which, when ATM network receives data from PDH network, receives bipolar analog data of T1 or E1, and converts bipolar component into unipolar component, and provides primary converted analog data at the time of receiving data; a sending end converter TX 30 which, when PDH network receives data from ATM network receives analog data, and converts unipolar component into bipolar component, and provides primary bipolar analog data of T1 or E1; an oscillator 40 which provides reference clock to extract clock component in the analog data; and a line interface 20 which receives primary converted analog data and provides a received clock and PDH digital data when ATM network receives data from PDH network, and receives PDH digital data and a sending clock and provides analog data at the time of sending when PDH network receives data from ATM network.

The board identification unit 330 includes an LED 331 which displays working condition of the board; and a board ID 332 which determines the type of board by dip switch type in order to provide four kinds of services of T1 (1.544 Mbps), E1 (2.048 Mbps), T1 channelized (64 kbps×24 time slots), and E1 channelized (64 kbps×30 time slots or 64 kbps×31 time slots), and controls an interface signal according to each service types in order that the framer 102, the interface controller 103, and the AAL1-SAR 201 may be set to relevant interface type by using software.

As shown in FIG. 2B, the clock controller 304 includes a SRTS recovery block which receives 4 bit SRTS code from the AAL1-SAR 201, and primarily revises recovery clock of PDH data stream, and provides a recovery clock of primarily revised PDH data stream; a jitter absorber which receives the recovery clock of a primarily revised PDH data stream from the SRTS recovery block, and removes jitter and wander, and generates a recovery clock of secondarily revised PDH data stream; and an SRTS clock distributor which receives a recovery clock of the secondarily revised PDH data stream from the jitter absorber, and provides the same to the interface controller 103 of PDH interface 100 and the AAL1-SAR 201 of ATM interface 200.

The system clock distributor 309 includes a driver which receives and bypasses primary reference clock of 50 MHZ from a STARacer Clock Unit (SCU) which provides a reference clock of the ATM network, and provides to the buffer 207 with a 50 MHZ clock, and divides the 50 MHZ clock by two (2), and provides to the router 203 with a divided clock of 25 MHZ; and a phase locked loop (PLL) which receives a secondary reference clock of 8 kHz from the SCU which provides the reference clock of the ATM network, and multiply the secondary reference clock into 19.44 MHZ, and provides to the router 203, the cell multiplexer 202, the AAL1-SAR 201, and the clock controller 304 with the multiplied clock of 19.44 MHZ.

Static random-access-memories (SRAMs) 204, 205 and 206 are provided for the AAL1-SAR 201, the cell multiplexer 202, and the router 207 for temporarily saving each ATM cell stream and control information to the AAL1-SAR 201, the cell multiplexer 202, and the router 207, respectively.

Now, the process of transmission from PDH network to ATM network will now be described in detail with reference to FIGS. 1, 2A and 2B hereinbelow.

When PDH network subscribers receive data through transmission lines, the line interface unit 101 converts a bipolar data signal from the transmission lines into a unipolar signal which is to be used at the interface module, and sends the unipolar signal to the framer 1021. If the data signal from the transmission lines is a T1 signal of 1.544 Mbps or a E1 signal of 2.048 Mbps, the data signal bypasses the framer 102 and is transmitted to AAL1-SAR 201 which provides ATM adaption layer type 1. If the data signal is 64 kbps time-slotted T1 channel or E1 channel, signal information is removed, and the data signal is gathered, and transmitted to AAL1-SAR 201 At this time, the interface controller 103 generates an interface control signal according to the characteristics of the input data. For example, in case the data signal is a T1 or E1 signal, the interface controller 103 generates data and a clock signal and transmits to AAL1-SAR 201. In case the data signal is a 64 kbps time-slotted T1 channel, the interface controller 103 generates a subframe synchronization signal, a superframe synchronization signal, signaling information bits. In case, the data signal is a 64 kbps time-slotted E1 channel, the interface controller 103 generates a frame alignment word synchronization (FAW) signal, signaling channel information, and transmits the same to AAL1-SAR 201.

The AAL1-SAR 104 converts PDH bit stream data to ATM cell stream type which has fixed-length of 53 bytes, and transmits the same to the next cell multiplexer 202. Cell can be underrun or overrun according to the condition of congestion in the network. In this case, the cell multiplexer 202 which is a sort of cell buffer, is used to control the cell condition under the capacity of the buffer, and processes cell header first and then transmit the same to the router 203.

The router 203 contains a path control table which stores VPI/VCI value according to the path. The router 203 sends VPI/VCI, which is according to the link, to cell header, and attaches a routing tag to the cell for transmission. The routing tag predetermines the path which the cell must pass through in the SSU which performs cell switching in the ATM network system.

The process of transferring data from ATM network to PDH network can also be accomplished in reverse. When the cell which becomes VPI/VCI is received from the SSU, the router 203 of ATM network determines as to what output port the data signal will be routed, and transfers the data signal to the cell multiplexer 202. The cell multiplexer 202 functions as a cell buffer, and transfers the data signal to the AAL1-SAR 201, where the AAL1-SAR converts the cell stream into PDH bit stream and sends the same to the framer 102. At this time, the interface controller 103 generates an interface control signal which is fit for the data signal which is transferred from AAL1-SAR, and sends the same to the framer 102. The framer 102 forms the data signal which is received from the AAL1-SAR into a T1 or E1 frame, or separates them into T1 channelized data and E1 channelized data, and transfers the T1 channelized data and E1 channelized data to the line interface unit 101. The line interface unit 101 transfers the T1 channelized data and E1 channelized data to each PDH subscribers through transferring lines.

Moreover, SRTS (Synchronous Residual Timing Stamp) function which converts clock information of PDH network into SRTS 4 bit code is involved in AAL1-SAR 201 in order that the clock information of PDH network may be transferred to PDH network through ATM network. The clock controller 304, which converts SRTS 4 bit code into clock information, controls the clock which is provided to transmission block and forwarded to PDH network in order that PDH data cell which comes to ATM network may be transferred to PDH network. AAL1-SAR 201 uses SRTS recovery block and SRTS clock distributor of clock controller 304 as illustrated in FIG. 2B, and converts 4 bit SRTR code, which is stored in ATM cell, into clock information, and provides the clock which is provided from the clock controller 304 to the transmission block, in order that the clock information of the PDH network may be transferred to PDH network through ATM network.

In case of board type, the hardware interface module is automatically set by using a dip switch in the interface module. This switch controls the interface controller 103, that is, the interface control signal between the framer 102 and AAL1-SAR 201 according to each service.

As described above, the network interface between PDH network and ATM network of this invention uses a single interface module to support four different types of service of PDH network. Therefore, the users need not purchase more than one interface module depending on the used PDH interface in order to support T1/E1, T1 channelized, E1 channelized services, and support eight (8) different ports according to service types.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for interfacing a plesiochronous digital hierarchy (PDH) network and an asynchronous transfer mode (ATM) network, comprising:

a line interface unit for interfacing between the plesiochronous digital hierarchy network and the asynchronous transfer mode network to receive bipolar analog data of T1 or E1 and provide plesiochronous digital hierarchy digital data when the asynchronous transfer mode network receives data from the plesiochronous digital hierarchy network, and to receive plesiochronous digital hierarchy digital data and provide primary bipolar analog data of T1 or E1 when the plesiochronous digital hierarchy network receives data from the asynchronous transfer mode network;

a framer for framing received multiple T1/E1 channelized data of the plesiochronous digital hierarchy network to generate frames and provide T1/E1 plesiochronous digital hierarchy data in one of a T1 and a E1 unchannelized mode, and to provide synchronization information and signaling information in one of a T1 and a E1 channelized mode;

an interface controller which, in one of the T1 and E1 channelized mode, receives the synchronization information and signaling information to distinguish time slot from said framer, and provides an interface signal containing information of frame overhead;

an asynchronous transfer mode Adaption Layer type 1—Segmentation and Reassembly (AAL1-SAR) device which divides asynchronous transfer mode cells into a plesiochronous digital hierarchy data stream or reassembles plesiochronous digital hierarchy data stream into asynchronous transfer mode cells, and services pulse code modulated (PCM) transfer data which contains characteristics of plesiochronous digital hierarchy network in the asynchronous transfer mode network;

a cell multiplexer which functions as a cell buffer, and also serves as a multiplexer and a demultiplexer;

a router which controls the routing of each asynchronous transfer mode cell based on virtual path identifier/virtual channel identifier at a routing table, and sends the virtual path identifier/virtual channel identifier value to a header of asynchronous transfer mode cell;

a buffer which receives an asynchronous transfer mode cell stream from said router for storage, and at a request for cell-switching, provides the stored asynchronous transfer mode cell stream;

a central processing unit module which connects the asynchronous transfer mode network and a network management system;

an address/data decoder which interfaces with said central processing unit module according to an address region and a data region depending on each input/output devices;

an interrupt controller which assigns an interrupt priority to the input/output devices of a prepared cycle, and controls the interrupt which is sent to said central processing unit module;

a bus controller which interfaces with each input/output devices according to 8, 16, and 32 bit data bus types;

a bus arbitrator which controls the right to use buses between said central processing unit module and an Ethernet controller which supports inter-process communication in the asynchronous transfer mode network;

a clock controller which extracts and processes synchronization information of plesiochronous digital hierarchy data stream contained in the cell stream of the asynchronous transfer mode network; and a system clock distributor which receives a system clock, and divides the system clock to the input/output devices.

2. The apparatus of claim 1, wherein said line interface unit comprises:

an receiving end converter which, when the asynchronous transfer mode network receives data from the plesiochronous digital hierarchy network, receives bipolar analog data of T1 or E1, and converts bipolar components into unipolar components, and provides primary converted analog data at the time of receiving data;

an sending end converter which, when the plesiochronous digital hierarchy network receives data from the asynchronous transfer mode network receives analog data, and converts unipolar components into bipolar components, and provides primary bipolar analog data of T1 or E1;

an oscillator which provides a reference clock to extract a clock component in the analog data; and a line interface which receives said primary converted analog data and provides plesiochronous digital hierarchy digital data when the asynchronous transfer mode network receives data from the plesiochronous digital hierarchy network, and receives said plesiochronous digital hierarchy digital data when the plesiochronous digital hierarchy network receives data from the asynchronous transfer mode network.

3. The apparatus of claim 1, wherein said plesiochronous digital hierarchy digital data of T1 or E1 which, when the asynchronous transfer mode network, receives data from the plesiochronous digital hierarchy network, are provided from said line interface unit to the asynchronous transfer mode Adaption Layer type 1—Segmentation and Reassembly (AAL1-SAR) device in the T1 and E1 unchannelized mode, and said synchronization information and signaling information are provided to said interface controller so that the asynchronous transfer mode Adaption Layer type 1—Segmentation and Reassembly (AAL1-SAR) device is provided with frames from said framer with multiple T1/E1 channelized data of plesiochronous digital hierarchy network, said received clock and plesiochronous digital hierarchy digital data of T1 or E1, in one of the T1 and E1 channelized mode.

4. The apparatus of claim 3, wherein said plesiochronous digital hierarchy data stream primarily processed from said asynchronous transfer mode Adaption Layer type 1—Segmentation and Reassembly (AAL1-SAR) device is provided to said cell multiplexer for demultiplexing, and provided to said router for routing of asynchronous transfer mode cells, and then provided to said buffer for storage.

5. The apparatus of claim 1, wherein said clock controller comprises:
   a synchronous residual timing stamp (SRTS) recovery unit which receives a 4 bit code from said asynchronous transfer mode Adaption Layer type 1—Segmentation and Reassembly (AAL1-SAR) device, and primarily revises a recovery clock of plesiochronous digital hierarchy data stream, and provides the recovery clock of primarily revised plesiochronous digital hierarchy data stream;
   a jitter absorber which receives the recovery clock of said primarily revised plesiochronous digital hierarchy data stream from said synchronous residual timing stamp recovery unit, and removes jitter and wander, and generates a recovery clock of secondarily revised plesiochronous digital hierarchy data stream; and
   a clock distributor which receives the recovery clock of said secondarily revised plesiochronous digital hierarchy data stream from said jitter absorber, and provides the same with said interface controller and said asynchronous transfer mode Adaption Layer type 1—Segmentation and Reassembly (AAL1-SAR) device.

6. The apparatus of claim 1, wherein said system clock distributor comprises:
   a driver which provides a primary reference clock of 50 MHZ to said buffer, and divides the primary reference clock by two, and provides a divided clock of 25 MHZ to said router; and
   a phase locked loop which provides a secondary reference clock of 8 kHz and multiplies the secondary reference clock, and provides a multiplied clock of 19.44 MHZ to said router, said cell multiplexer, said asynchronous transfer mode Adaption Layer type 1—Segmentation and Reassembly (AAL1-SAR) device, and said clock controller.

7. The apparatus of claim 1, further comprising:
   an LED which provides a visual display of working condition of a board; and
   a board identifier which determines the type of board by dip switch type in order to provide four different types of services of T1 (1.544 Mbps), E1 (2.048 Mbps), T1 channelized (64 kbps×24 time slots), and F1 channelized (64 kbps×30 time slots or 64 kbps×31 time slots), and controls generation of said interface signal according to each service types in order that said framer, said interface controller, and said asynchronous transfer mode Adaption Layer type 1—Segmentation and Reassembly (AAL1-SAR) device may be set to relevant interface type by using software.

8. The apparatus of claim 1, further comprising a plurality of statics random-access-memories for temporarily saving each asynchronous transfer mode cell stream and controlling information to said asynchronous transfer mode Adaption Layer type 1—Segmentation and Reassembly (AAL1-SAR) device, said cell multiplexer, and said router, respectively.

9. The apparatus of claim 1, said apparatus generates only data and clock signal in case of T1 (1.544 Mbps) or E1 (2.048 Mbps) signal,
   generates subframe synchronization signal, superframe synchronization signal, and signaling information bits in case of T1 channelized (64 kbps×24 time slots) signal,
   generates frame alignment word synchronization signal and signaling channel information in case of E1 channelized (64 kbps×30 time slots or 64 kbps×31 time slots) signal, and compoundly accepts primary speed data from a interface module which accesses plesiochronous digital hierarchy network and asynchronous transfer mode network.

10. The apparatus of claim 1, further comprising a board type identification switch for providing T1 (1.544 Mbps), E1 (2.048 Mbps), T1 channelized (64 kbps×24 time slots), and E1 channelized (64 kbps×30 time slots or 64 kbps×31 time slots) data, and generating said interface signal between said framer and said asynchronous transfer mode Adaption Layer type 1—Segmentation and Reassembly (AAL1-SAR) device, and compositively accepting primary transmission speed (T1/E1) data.

11. The apparatus of claim 1, wherein said framer, said line interface unit, and said synchronous residual timing stamp clock distributor accepts primary transmission speed (T1/E1) data which can use up to a maximum of 8 ports per each service, using said asynchronous transfer mode Adaption Layer type 1—Segmentation and Reassembly (AAL1-SAR) device.

12. A network interface module for a plesiochronous digital hierarchy (PDH) network and an asynchronous transfer mode (ATM) network, comprising:
   a plesiochronous digital hierarchy interface unit connected to transmission lines of T1 or E1 standard for interfacing a plesiochronous digital hierarchy network, said plesiochronous digital hierarchy interface unit comprising a line interface unit, a framer, and an interface controller;
   an asynchronous transfer mode interface unit connected to said plesiochronous digital hierarchy interface unit for interfacing an asynchronous transfer mode network, said asynchronous transfer mode interface unit comprising an asynchronous transfer mode Adaption Layer Type 1—Segmentation and Reassembly (AAL1-SAR) device, a cell multiplexer, a router, and a buffer; and
   an input/output control unit connected to said plesiochronous digital hierarchy interface unit and said asynchronous transfer mode interface unit via a system bus for controlling interface functions of said plesiochronous digital hierarchy interface unit to said plesiochronous digital hierarchy network and said asynchronous transfer mode interface unit to said asynchronous transfer mode network;

said line interface unit interfacing between the plesiochronous digital hierarchy network and the asynchronous transfer mode network to receive bipolar analog data of T1 or E1 and provide plesiochronous digital hierarchy digital data when the asynchronous transfer mode network receives data from the plesiochronous digital hierarchy network, and to receive plesiochronous digital hierarchy digital data and provide primary bipolar analog data of T1 or E1 when the plesiochronous digital hierarchy network receives data from the asynchronous transfer mode network;

said framer framing received multiple T1/E1 channelized data of the plesiochronous digital hierarchy network to generate frames and provide T1/E1 plesiochronous digital hierarchy data in one of a T1 and a E1 unchannelized mode, and to provide synchronization information and signaling information in one of a T1 and a E1 channelized mode;

said interface controller receiving, in one of the T1 and E1 channelized mode, the synchronization information and signaling information to distinguish time slot from said framer, and providing an interface signal containing information of frame overhead; and said asynchronous transfer mode Adaption Layer type 1—Segmentation and Reassembly (AAL1-SAR) device dividing asynchronous transfer mode cells into a plesiochronous digital hierarchy data stream or reassembling plesiochronous digital hierarchy data stream into asynchronous transfer mode cells, and providing pulse code modulated (PCM) transfer data which contains characteristics of plesiochronous digital hierarchy network in the asynchronous transfer mode network, wherein said line interface unit comprises:

a receiving end converter which, when the asynchronous transfer mode network receives data from the plesiochronous digital hierarchy network, receives bipolar analog data of T1 or E1, and converts bipolar components into unipolar components, and provides primary converted analog data at the time of receiving data;

a sending end converter which, when the plesiochronous digital hierarchy network receives data from the asynchronous transfer mode network receives analog data, and converts unipolar components into bipolar components, and provides primary bipolar analog data of T1 or E1;

an oscillator which provides a reference clock to extract a clock component in the analog data; and a line interface which receives said primary converted analog data and provides plesiochronous digital hierarchy digital data when the asynchronous transfer mode network receives data from the plesiochronous digital hierarchy network, and receives said plesiochronous digital hierarchy digital data when the plesiochronous digital hierarchy network receives data from the asynchronous transfer mode network.

13. The network interface module of claim 12, further comprised of:

said cell multiplexer functioning as a cell buffer, and also serving as a multiplexer and a demultiplexer;

said router which controls the routing of each asynchronous transfer mode cell based on virtual path identifier/virtual channel identifier at a routing table, and sends the virtual path identifier/virtual channel identifier value to a header of asynchronous transfer mode cell; and said buffer which receives an asynchronous transfer mode cell stream from said router for storage, and at a request for cell-switching, provides the stored asynchronous transfer mode cell stream.

14. The network interface module of claim 13, wherein said input/output control unit comprises:

a central processing unit (CPU) module which connects the asynchronous transfer mode network and a network management system;

an address/data decoder which interfaces with said central processing unit (CPU) module according to an address region and a data region depending on each input/output devices;

an interrupt controller which assigns an interrupt priority to the input/output devices of a prepared cycle, and controls the interrupt which is sent to said central processing unit (CPU) module;

a bus controller which interfaces with each input/output devices according to 8, 16, and 32 bit data bus types;

a bus arbitrator which controls the right to use buses between said central processing unit (CPU) module and an Ethernet controller which supports inter-process communication in the asynchronous transfer mode network;

a clock controller which extracts and processes synchronization information of plesiochronous digital hierarchy data stream contained in the cell stream of the asynchronous transfer mode network; and a system clock distributor which receives a system clock, and divides the system clock to the input/output devices.

15. The network interface module of claim 14, wherein said clock controller comprises:

a synchronous residual timing stamp (SRTS) recovery unit which receives a 4 bit code from said asynchronous transfer mode Adaption Layer Type 1—Segmentation and Reassembly device, and primarily revises a recovery clock of plesiochronous digital hierarchy data stream, and provides the recovery clock of primarily revised plesiochronous digital hierarchy data stream;

a jitter absorber which receives the recovery clock of said primarily revised plesiochronous digital hierarchy data stream from said synchronous residual timing stamp recovery unit, and removes jitter and wander, and generates a recovery clock of secondarily revised plesiochronous digital hierarchy data stream; and a clock distributor which receives the recovery clock of said secondarily revised plesiochronous digital hierarchy data stream from said jitter absorber, and provides the same with said interface controller and said asynchronous transfer mode Adaption Layer Type 1—Segmentation and Reassembly device.

16. The network interface module of claim 15, wherein said system clock distributor comprises:

a driver which provides a primary reference clock of 50 MHZ to said buffer, and divides the primary reference clock by two, and provides a divided clock of 25 MHZ to said router; and a phase locked loop which provides a secondary reference clock of 8 kHz and multiplies the secondary reference clock, and provides a multiplied clock of 19.44 MHZ to said router, said cell multiplexer, said asynchronous transfer mode Adaption Layer Type 1—Segmentation and Reassembly device, and said clock controller.

17. The network interface module of claim 16, further comprising:
- a light emitting diode which provides a visual display of working condition of a board; and
- a board identifier which determines the type of board by dip switch type in order to provide four different types of services of T1 (1.544 Mbps), E1 (2.048 Mbps), T1 channelized (64 kbps×24 time slots), and E1 channelized (64 kbps×30 time slots or 64 kbps×31 time slots), and controls generation of said interface signal according to each service types in order that said framer, said interface controller, and said asynchronous transfer mode Adaption Layer Type 1—Segmentation and Reassembly device may be set to relevant interface type by using software.

18. The network interface module of claim 17, further comprising a plurality of statics random-access-memories for temporarily saving each asynchronous transfer mode cell stream and controlling information to said asynchronous transfer mode Adaption Layer Type 1—Segmentation and Reassembly device, said cell multiplex er, and said router, respectively.

* * * * *